(12) United States Patent
Addaguduru (10) Patent No.: US 9,471,150 B1
(45) Date of Patent: Oct. 18, 2016

(54) OPTIMIZED GESTURES FOR ZOOM FUNCTIONALITY ON TOUCH-BASED DEVICE

(71) Applicant: EMC Corporation, Hopkinton, MA (US)

(72) Inventor: Chandramouli Addaguduru, Bangalore (IN)

(73) Assignee: EMC Corporation, Hopkinton, MA (US)

( * ) Notice: Subject to any disclaimer, the term of this patent is extended or adjusted under 35 U.S.C. 154(b) by 190 days.

(21) Appl. No.: 14/040,521

(22) Filed: Sep. 27, 2013

(51) Int. Cl.
*G06F 3/01* (2006.01)
*G06F 3/0486* (2013.01)
*G06F 3/0488* (2013.01)

(52) U.S. Cl.
CPC .............. *G06F 3/017* (2013.01); *G06F 3/0486* (2013.01); *G06F 3/0488* (2013.01)

(58) Field of Classification Search
CPC ..... G06F 3/0488; G06F 3/0486; G06F 3/017
See application file for complete search history.

(56) References Cited

U.S. PATENT DOCUMENTS

| | | | | |
|---|---|---|---|---|
| 7,840,912 B2* | 11/2010 | Elias et al. | ..................... | 715/863 |
| 2008/0168403 A1* | 7/2008 | Westerman | ......... G06F 3/04883 | 715/863 |
| 2008/0168404 A1* | 7/2008 | Ording | ......................... | 715/863 |
| 2010/0097342 A1* | 4/2010 | Simmons | ............. G06F 3/0416 | 345/174 |
| 2010/0287470 A1* | 11/2010 | Homma et al. | ............... | 715/702 |
| 2011/0169750 A1* | 7/2011 | Pivonka et al. | .............. | 345/173 |
| 2011/0316888 A1* | 12/2011 | Sachs et al. | .................. | 345/667 |
| 2012/0306767 A1* | 12/2012 | Campbell | ..................... | 345/173 |
| 2013/0016103 A1* | 1/2013 | Gossweiler et al. | .......... | 345/428 |
| 2013/0033448 A1* | 2/2013 | Yano et al. | .................... | 345/173 |
| 2013/0285949 A1* | 10/2013 | Manabe et al. | ............... | 345/173 |
| 2013/0288790 A1* | 10/2013 | Wang | .............................. | 463/31 |
| 2013/0328391 A1* | 12/2013 | Jerusalem | .................... | 307/10.1 |
| 2014/0033108 A1* | 1/2014 | Paccagnan | ........... G05B 19/409 715/771 |
| 2014/0033130 A1* | 1/2014 | Paccagnan | ........... G05B 19/409 715/835 |

OTHER PUBLICATIONS

Boring, Sebastian et al., "The Fat Thumb: Using the Thumb's Contact Size for Single-Handed Mobile Interaction," MobileHCI'12, Proceedings of the 14th international conference on Human-computer interaction with mobile devices and services, pp. 39-48, ACM, ISBN 978-1-4503-1105-2, doi 10.1145/2371574.2371582.*

* cited by examiner

*Primary Examiner* — Doon Chow
*Assistant Examiner* — Wilson Varga
(74) *Attorney, Agent, or Firm* — Van Pelt, Yi & James LLP (57) ABSTRACT

A first directional touch gesture on a display area and a second directional touch gesture on the display area are received simultaneously, wherein: the first directional touch gesture is on a left side of the display area; the second directional touch gesture is on a right side of the display area; and a first direction associated with the first directional touch gesture is identical to a second direction associated with the second directional touch gesture. Content is scaled within the display area based at least in part on the identical direction associated with the simultaneous directional touch gestures.

14 Claims, 5 Drawing Sheets

OPTIMIZED GESTURES FOR ZOOM FUNCTIONALITY ON TOUCH-BASED DEVICE

BACKGROUND OF THE INVENTION

Traditionally, enterprise collaboration software, including one or more of: groupware, collaborative management tools, collaborative project management tools, communication tools, conferencing software, co-ordination tools, calendars, email, chat, contacts management, fax, telephony, videoconferencing, web conferencing, application sharing, wikis, charting, revision control, document versioning and retention, electronic meeting and intranet tools have been used on a traditional personal computer or workstation using a keyboard and/or mouse as user interface devices.

Contemporary users may begin to use touch-based devices such as a tablet. There is a need for the user interface ("UI") of enterprise collaboration software and software in general to become more efficient for touch-based devices.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A proposed new set of gestures for scaling content within a display area is disclosed. The set of gestures attempts to optimize user hand movements in touch-based device display areas to scale, or zoom in and out, for more efficient navigation.

Traditional sets of gestures for scaling touch-based devices may force a user to dedicate one hand completely to perform the gesture. The user, who may be firmly holding the device, for example a tablet, with both hands along the side of the device, may be required to take either of their hands off and do a pinch, spiral, or other gesture on the display area to achieve scaling like a zoom in or zoom out. Using a dedicated hand for scaling thus requires a loosening of the grip on the tablet, breaks up the workflow decreasing productivity or taking additional time, may be less ergonomic and/or more prone to repetitive stress injury, and may cause annoyance on the part of the user.

The proposed new set of gestures allows the user to keep their hands on both sides of the touch-based device. Generally, the set of gestures is to slightly move both thumbs up and down in a given controlled space on the sides of the screen to achieve zoom in/out the screen. Throughout this specification a thumb refers without loss of generality to any touch by any human or mechanical device, including an actual human thumb, human finger, anatomical digit, glove, mechanical hand, pointer device, touching mechanism, and remote pointer. One desired result of this set of gestures is that a user may not even have to move their hand(s) off from holding the device.

Figure 1:
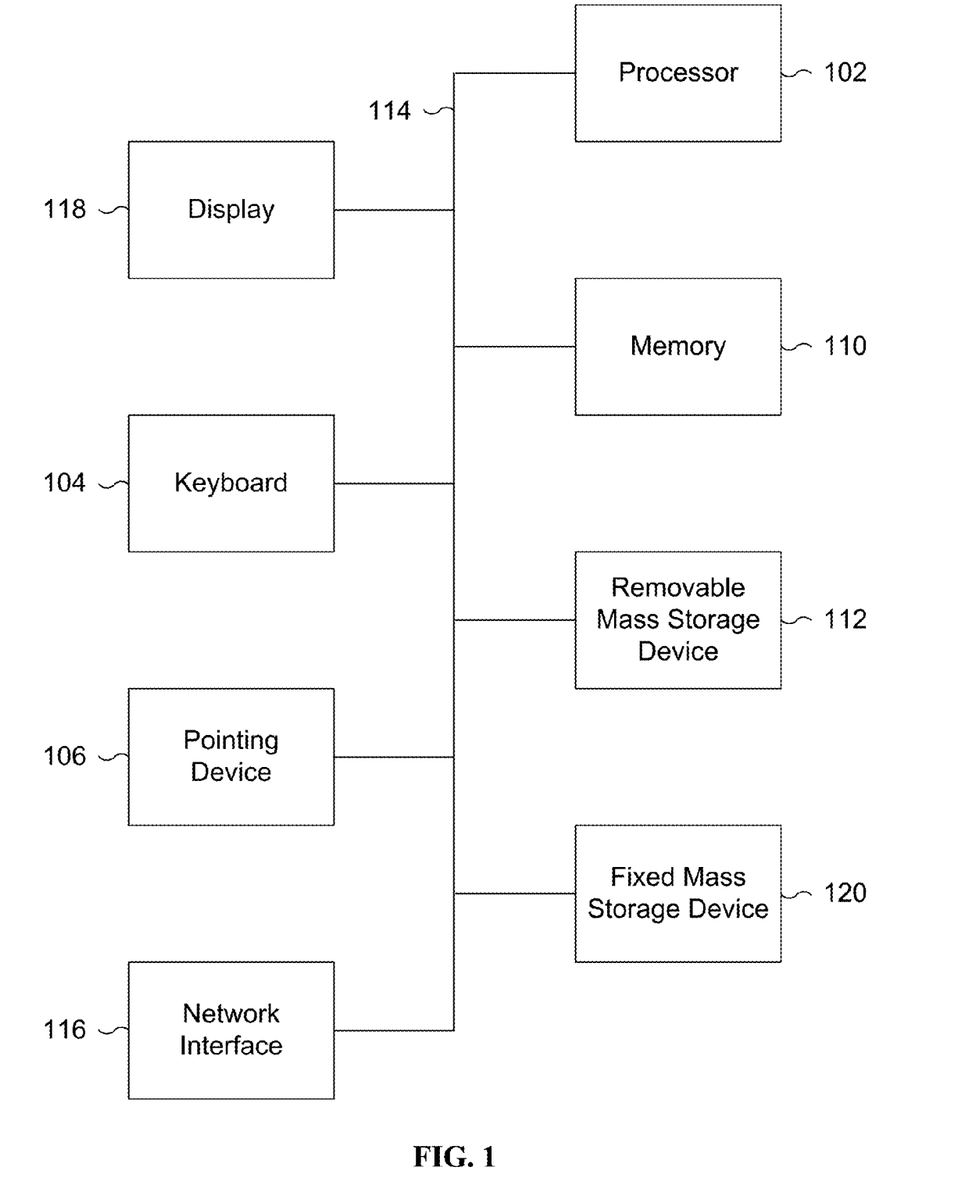
FIG. 1 is a functional diagram illustrating a programmed computer system for distributed workflows in accordance with some embodiments.

FIG. 1 is a functional diagram illustrating a programmed computer system for distributed workflows in accordance with some embodiments. As shown, FIG. 1 provides a functional diagram of a general purpose computer system programmed to execute workflows in accordance with some embodiments. As will be apparent, other computer system architectures and configurations can be used to execute workflows. Computer system 100, which includes various subsystems as described below, includes at least one microprocessor subsystem, also referred to as a processor or a central processing unit ("CPU") 102. For example, processor 102 can be implemented by a single-chip processor or by multiple cores and/or processors. In some embodiments, processor 102 is a general purpose digital processor that controls the operation of the computer system 100. Using instructions retrieved from memory 110, the processor 102 controls the reception and manipulation of input data, and the output and display of data on output devices, for example display 118.

Processor 102 is coupled bi-directionally with memory 110, which can include a first primary storage, typically a random access memory ("RAM"), and a second primary storage area, typically a read-only memory ("ROM"). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as well known in the art, primary storage typically includes basic operating instructions, program code, data and objects used by the processor 102 to perform its functions, for example programmed instructions. For example, primary storage devices 110 can include any suitable computer-readable storage media, described below, depending on whether, for example, data access needs to be bi-directional or uni-directional. For example, processor 102 can also directly and very rapidly retrieve and store frequently needed data in a cache memory, not shown.

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storage 112, 120 generally store additional programming instructions, data, and the like that typically are not in active use by the processor 102. It will be appreciated that the information retained within mass storage 112, 120 can be incorporated, if needed, in standard fashion as part of primary storage 110, for example RAM, as virtual memory.

In addition to providing processor 102 access to storage subsystems, bus 114 can be used to provide access to other subsystems and devices as well. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information, for example data objects or program instructions, from another network, or output information to another network in the course of performing method/process steps. Information, often represented as a sequence of instructions to be executed on a processor, can be received from and outputted to another network. An interface card or similar device and appropriate software implemented by, for example executed/performed on, processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Throughout this specification "network" refers to any interconnection between computer components including the Internet, Ethernet, intranet, local-area network ("LAN"), home-area network ("HAN"), serial connection, parallel connection, wide-area network ("WAN"), Fibre Channel, PCI/PCI-X, AGP, VLbus, PCI Express, Expresscard, Infiniband, ACCESS.bus, Wireless LAN, WiFi, HomePNA, Optical Fibre, G.hn, infrared network, satellite network, microwave network, cellular network, virtual private network ("VPN"), Universal Serial Bus ("USB"), FireWire, Serial ATA, 1-Wire, UNI/O, or any form of connecting homogenous, heterogeneous systems and/or groups of systems together. Additional mass storage devices, not shown, can also be connected to processor 102 through network interface 116.

An auxiliary I/O device interface, not shown, can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits ("ASIC"s), programmable logic devices ("PLD"s), and ROM and RAM devices. Examples of program code include both machine code, as produced, for example, by a compiler, or files containing higher level code, for example a script, that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2:
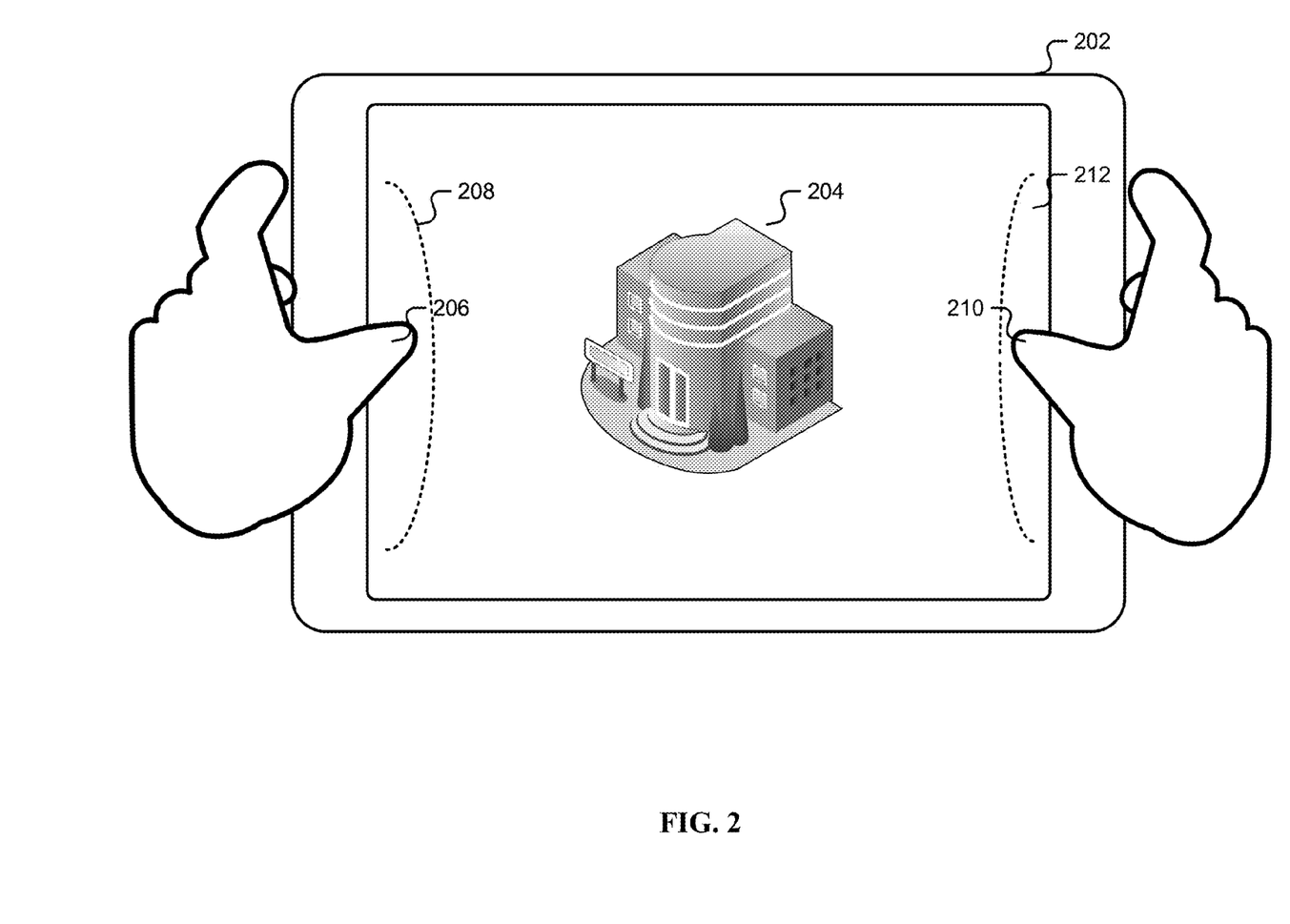
FIG. 2 is an illustration of a user using a touch-based device.

FIG. 2 is an illustration of a user using a touch-based device. Touch-based device 202 is held by a user with one or more hands. Without loss of generality, FIG. 2 shows a tablet device being held by a user with two hands. The touch-based device 202 is showing content 204, in this case an image of a building, and has a left thumb 206 over a left side portion of the display area 208, and a right thumb 210 over a right side portion of the display area 212. Without loss of generality, the left side portion 208 and right side portion 212 of the display area is shown to be a geometric area within a reasonable distance that any user handling the device 202 might reach with a thumb without extraordinary effort or extension. In FIG. 2 the thumbs 206 and 210 are shown either hovering over the screen or touching the areas 208 and 212 respectively, but without any motion.

Figure 3A:
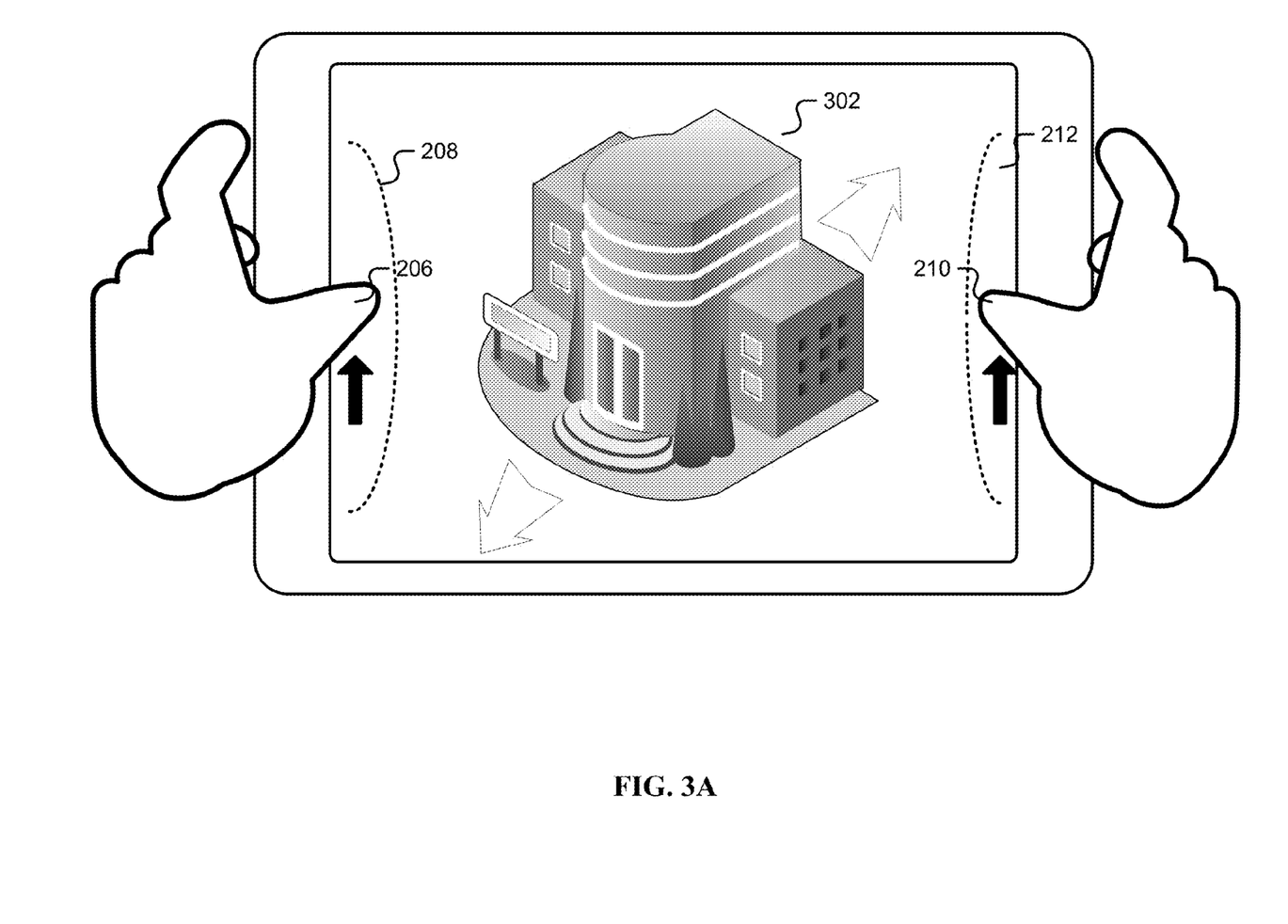
FIG. 3A is an illustration of a user using a touch-based device to scale up content within the display area.

FIG. 3A is an illustration of a user using a touch-based device to scale up content within the display area.

By moving both thumbs 206 and 210 slightly up together, shown by the filled black arrows and simultaneously (within reasonable time limits) on the respective sides 208 and 212 of the display area, the content 204 is zoomed in to scaled content 302, shown by the hollow white arrows. In some embodiments, the percentage of zooming in is proportionate to the distance of the thumbs movement. The gesture that thumbs 206 and 210 both do can be any touch gesture, including but not limited to: a touch and drag gesture, a swipe gesture, a push gesture and a roll gesture.

In some embodiments, the user does not need to move their thumbs to an extreme extension; as a coordinated gesture with both fingers, just a slight movement of both thumbs together in synchronicity provides the zooming in functionality. In some embodiments 100% of zooming in is proportionate to moving both thumbs 50 mm. In other embodiments 100% of zooming in is proportionate to moving both thumbs 20 mm.

Figure 3B:
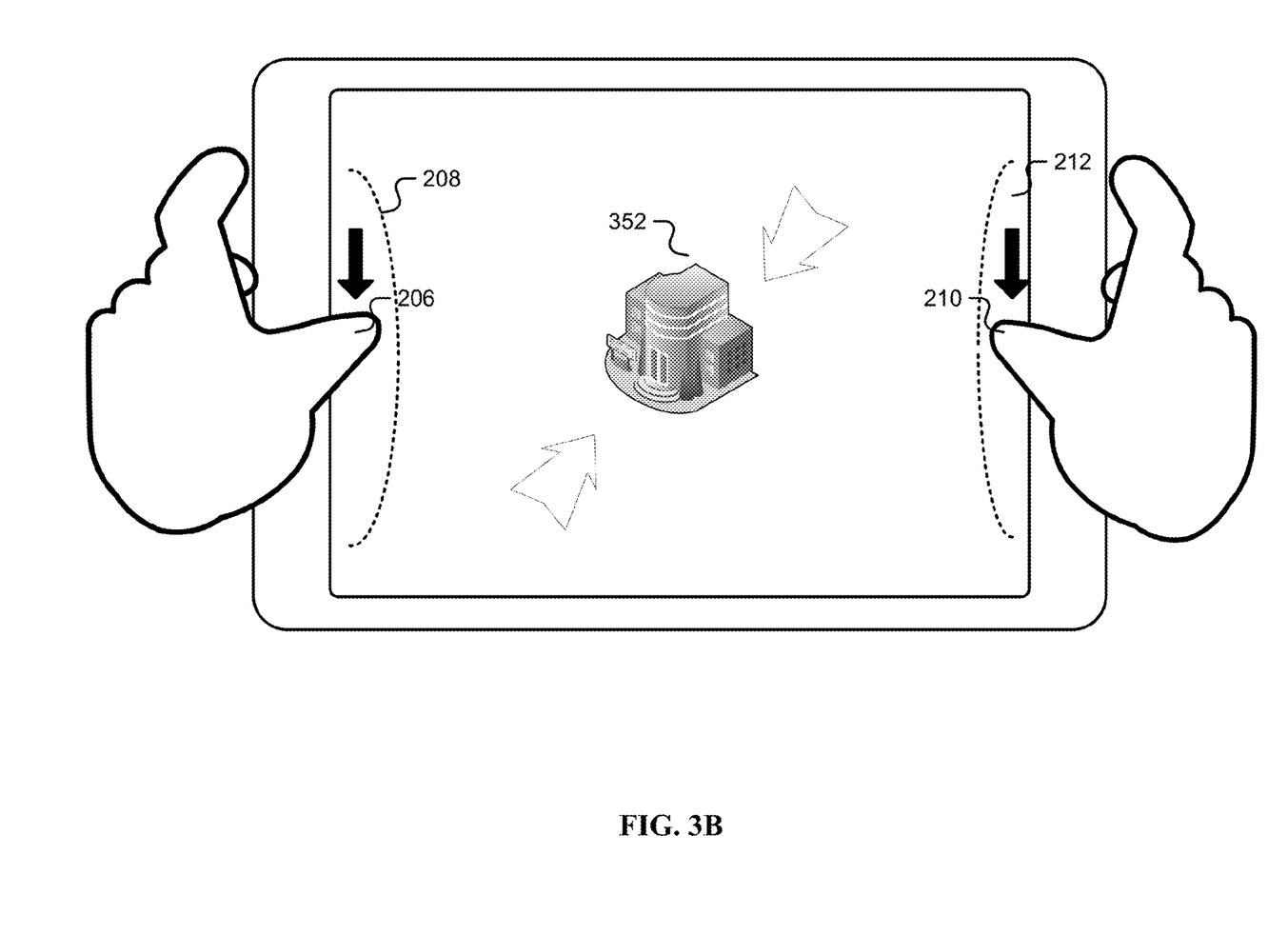
FIG. 3B is an illustration of a user using a touch-based device to scale down content within the display area.

FIG. 3B is an illustration of a user using a touch-based device to scale down content within the display area.

By moving both thumbs 206 and 210 slightly down together, shown by the filled black arrows and simultaneously (within reasonable time limits) on the respective sides 208 and 212 of the display area, the content 204 is zoomed out to scaled content 352, shown by the hollow white arrows. In some embodiments, the percentage of zooming out is proportionate to the distance of the thumbs movement. The gesture that thumbs 206 and 210 both do can be any touch gesture, including but not limited to: a touch and drag gesture, a swipe gesture, a push gesture and a roll gesture.

In some embodiments, the user does not need to move their thumbs to an extreme extension; as a coordinated gesture with both fingers, just a slight movement of both thumbs together in synchronicity provides the zooming out functionality. In some embodiments 100% of zooming out is proportionate to moving both thumbs 50 mm. In other embodiments 100% of zooming out is proportionate to moving both thumbs 20 mm.

Figure 4:
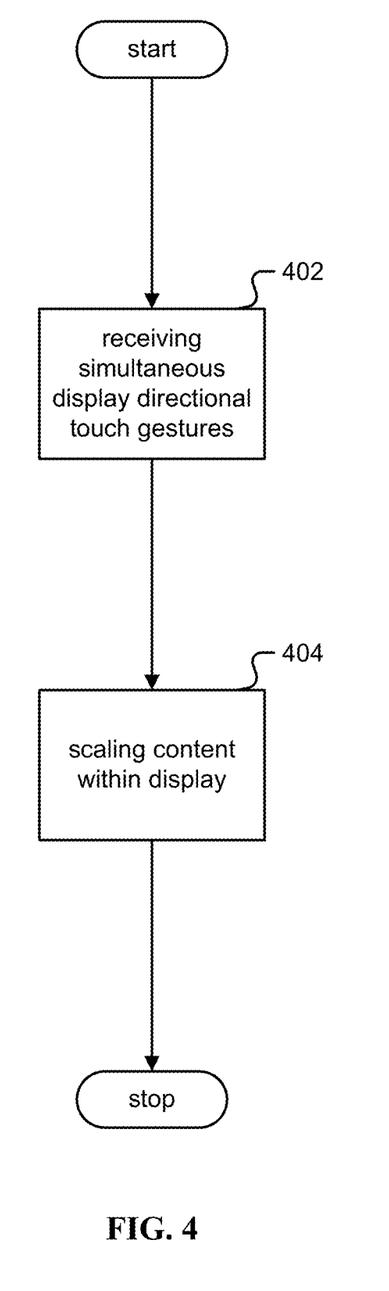
FIG. 4 is a flow chart illustrating an embodiment of a UI for scaling content.

FIG. 4 is a flow chart illustrating an embodiment of a UI for scaling content. In some embodiments, the flow chart is carried out by touch-based device 202 in FIG. 2.

In step 402, a first directional touch gesture on a display area and a second directional touch gesture on the display area are received simultaneously, wherein:
    a. the first directional touch gesture is on a left side of the display area, for example area 208 in FIG. 2;
    b. the second directional touch gesture is on a right side of the display area, for example area 210 in FIG. 2; and
    c. a first direction associated with the first directional touch gesture is identical to a second direction associated with the second directional touch gesture, for example the direction "up" or "down".

Throughout this specification, the term simultaneous gesture may refer without limitation to any coordinated gesture that would appear to be simultaneous by any human being and that are within reasonable human limits of hand-eye coordination. Thus if a left thumb up gesture and right thumb up gesture are received not precisely at the same time within picoseconds, but instead would be perceived to be simultaneous as described earlier in this paragraph, they are considered simultaneous by both this application and the system by way of configuration and threshold parameters.

In step 404, content is scaled within the display area based at least in part on the identical direction associated with the simultaneous directional touch gestures. For example, if the identical direction is up, the content is zoomed in and/or scaled up. For example, if the identical direction is down, the content is zoomed out and/or scaled down.

In some embodiments a configuration parameter may be to allow the percentage of scaling, whether zooming in, zooming out, and/or both zooming in and out, to be proportionate to a distance associated with one or more of the following: the first directional touch gesture, the second directional touch gesture, and a combination of the first directional touch gesture and second directional touch gesture. For example, if the simultaneous gestures include a left thumb 206 dragging up 8 mm and a right thumb 210 dragging up 6 mm, the system may take a measurement of 8 mm, 6 mm, or 7 mm (an average of the two) to be the value proportionate to the scaling. For example if the 100% value is 20 mm, this may represent zooming in of 8 mm/20 mm=40%, 6 mm/20 mm=30%, or 7 mm/20 mm=35%, respectively.

Advantages of New Set of Gestures.

The traditional gestures for scaling content for touch-based devices may force a user to take their hand off grasping the device and dedicate one hand completely to perform the gesture, for example a pinch gesture.

The advantages of the new set of gestures includes that:
- they are an easy-to-use gesture and optimize user hand movements from their natural grasp on device 202;
- they do not require a dedicated hand to execute zoom in/out functionality, nor do they require taking any hand off from grasping the device;
- the user does not need to stretch thumbs to the extreme which may harm the user over repetitive stress. Relying more on the simultaneous/coordinated gesture of both fingers, all that may be required is a slight movement of both the thumbs together to provide zoom in/out functionality;
- they are easy to memorize the set of gestures and require no motor or memory load, for example as per the "VIMM model" for Visual load, Intellectual load, Memory load, and Motor load;
- the set of gestures may be adopted for all types of touch screen devices independent of the aspect ratio or size of the touch pad, and can also be used for devices like touch screen monitors; and
- if required, the system can be configured just to work with either of the thumbs movement to accommodate accessibility challenges.

The system can be configured using parameters to use a single thumb movement to accommodate accessibility challenges. For example, parameters may be set with a defined sustain period, speed parameters, precision parameters, and/or longer/different movement of thumb to indicate zoom direction and proportion.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving a first directional touch gesture on a display area associated with a touch-based device and a second directional touch gesture on the display area simultaneously, wherein:
    the first directional touch gesture is made by a user left thumb on a left side of the display area while a user left hand is firmly holding the touch-based device;
    the second directional touch gesture is made by a user right thumb on a right side of the display area while a user right hand is firmly holding the touch-based device; and
    a first direction associated with the first directional touch gesture is identical to a second direction associated with the second directional touch gesture;
receiving a first measurement associated with the first directional touch gesture, comprising a first distance that the user left thumb moves;
receiving a second measurement associated with the second directional touch gesture, comprising a second distance that the user right thumb moves;
determining a scaling value based on a function of the first distance and the second distance, wherein the function comprises one or more of: an average of the first distance and the second distance, a minimum of the first distance and the second distance, and a maximum of the first distance and the second distance; and scaling content within the display area in proportion to the scaling value, comprising:
  zooming in within the display area when the identical direction associated with the simultaneous directional touch gestures is towards a top side of the display area; and
  zooming out within the display area when the identical direction associated with the simultaneous direction touch gestures is towards a bottom side of the display area.

2. The method of claim 1, wherein 100% of zooming in is proportionate to the distance at 50 mm.

3. The method of claim 1, wherein 100% of zooming in is proportionate to the distance at 20 mm.

4. The method of claim 1, wherein a percentage of zooming out is proportionate to a distance associated with one or more of the following: the first directional touch gesture, the second directional touch gesture, and a combination of the first directional touch gesture and second directional touch gesture.

5. The method of claim 4, wherein 100% of zooming out is proportionate to the distance at 50 mm.

6. The method of claim 4, wherein 100% of zooming out is proportionate to the distance at 20 mm.

7. The method of claim 1, wherein at least one of the first directional touch gesture and second directional touch gesture are associated with a user's anatomical digit.

8. The method of claim 1, wherein at least one of the first directional touch gesture and second directional touch gesture are a touch and drag gesture.

9. A system, comprising
  a display area associated with a touch-based device configured to:
    receive a first directional touch gesture on the display area and a second directional touch gesture on the display area simultaneously, wherein:
      the first directional touch gesture is made by a user left thumb on a left side of the display area while a user left hand is firmly holding the touch-based device;
      the second directional touch gesture is made by a user right thumb on a right side of the display area while a user right hand is firmly holding the touch-based device; and
      a first direction associated with the first directional touch gesture is identical to a second direction associated with the second directional touch gesture;
    receive a first measurement associated with the first directional touch gesture comprising a first distance that the user left thumb moves; and
    receive a second measurement associated with the second directional touch gesture comprising a second distance that the user right thumb moves; a processor coupled to the display area and configured to:
      determine a scaling value based on a function of the first measurement distance and the second measurement distance, wherein the function comprises one or more of: an average of the first distance and the second distance, a minimum of the first distance and the second distance, and a maximum of the first distance and the second distance; and
    scale content within the display area in proportion to the scaling value comprising:
      zooming in within the display area when the identical direction associated with the simultaneous directional touch gestures is towards a top side of the display area; and
      zooming out within the display area when the identical direction associated with the simultaneous direction touch gestures is towards a bottom side of the display area; and
  a memory coupled to the processor and configured to provide the processor with instructions.

10. The system recited in claim 9, wherein:
  a percentage of zooming in is proportionate to the scaling value.

11. The system recited in claim 9, wherein:
  a percentage of zooming out is proportionate to the scaling value.

12. A computer program product, the computer program product being embodied in a non-transitory computer readable storage medium and comprising computer instructions for:
  receiving a first directional touch gesture on a display area associated with a touch-based device and a second directional touch gesture on the display area simultaneously, wherein:
    the first directional touch gesture is made by a user left thumb on a left side of the display area while a user left hand is firmly holding the touch-based device;
    the second directional touch gesture is made by a user right thumb on a right side of the display area while a user right hand is firmly holding the touch-based device; and
    a first direction associated with the first directional touch gesture is identical to a second direction associated with the second directional touch gesture;
  receiving a first measurement associated with the first directional touch gesture comprising a first distance that the user left thumb moves;
  receiving a second measurement associated with the second directional touch gesture comprising a second distance that the user right thumb moves;
  determining a scaling value based on a function of the first distance and the second distance, wherein the function comprises one or more of: an average of the first distance and the second distance, a minimum of the first distance and the second distance, and a maximum of the first distance and the second distance; and
  scaling content within the display area in proportion to the scaling value, comprising:
    zooming in within the display area when the identical direction associated with the simultaneous directional touch gestures is towards a top side of the display area; and
    zooming out within the display area when the identical direction associated with the simultaneous direction touch gestures is towards a bottom side of the display area.

13. The computer program product recited in claim 12, wherein:
  a percentage of zooming in is proportionate to the scaling value.

14. The computer program product recited in claim 12, wherein:

a percentage of zooming out is proportionate to the scaling value.

\* \* \* \* \*